United States Patent [19]
Yankielun et al.

[11] Patent Number: 5,585,799
[45] Date of Patent: Dec. 17, 1996

[54] MICROWAVE DOPPLER RADAR SYSTEM FOR DETECTION AND KINEMATIC MEASUREMENTS OF RIVER ICE

[75] Inventors: Norbert E. Yankielun, Lebanon, N.H.; Michael G. Ferrick, White River Jct., Vt.

[73] Assignee: The United States of America as represented by the Secretary of the Army, Washington, D.C.

[21] Appl. No.: 487,770

[22] Filed: Jun. 8, 1995

[51] Int. Cl.⁶ .................................................. G01S 13/58
[52] U.S. Cl. ............................................ 342/115; 342/26
[58] Field of Search .............................. 342/26, 28, 104, 342/115, 41; 73/170.29

[56] References Cited

U.S. PATENT DOCUMENTS

| | | | |
|---|---|---|---|
| 4,195,296 | 3/1980 | Williams | 342/28 |
| 4,300,121 | 11/1981 | Fritzsche | 73/170.16 |
| 4,495,499 | 1/1985 | Richardson | 342/28 |
| 4,680,961 | 7/1987 | Grauman et al. | 73/170.29 |
| 4,885,591 | 12/1989 | Page | 342/41 |

*Primary Examiner*—Daniel T. Pihulic
*Attorney, Agent, or Firm*—Luther A. Marsh

[57] ABSTRACT

The present invention pertains to a microwave continuous wave (CW) Doppler radar system for river ice motion detection and real-time kinematic data acquisition using digital signal processing equipment for processing, storing and displaying such data. With less complex electronic signal processing hardware, a Doppler radar ice motion detection and alarming system can be used in conjunction with the system. River ice kinematic measurements are fundamental to analyses of river/ice dynamics. The system herein can be rapidly deployed, requires minimal operator interaction, and can continuously acquire, process, store and display ice kinematic data regardless of visibility conditions. Use of the Doppler radar system is an effective, efficient and precise method and apparatus for obtaining river ice kinematic data.

10 Claims, 11 Drawing Sheets

MICROWAVE DOPPLER RADAR SYSTEM FOR DETECTION AND KINEMATIC MEASUREMENTS OF RIVER ICE

STATEMENT OF GOVERNMENT INTEREST

The invention described herein may be manufactured and used by or for the United States Government for governmental purposes without the payment of any royalties thereon.

FIELD OF THE INVENTION

This invention pertains to a river ice kinematic data acquisition method with detection/alarm capability that uses a microwave continuous wave Doppler radar system in combination with electronic signal processing equipment.

BACKGROUND OF THE INVENTION

River ice kinematic data measurements during winter frazil ice flow and spring ice breakup are necessary for: i) analysis of river/ice dynamics and ii) flood hazard or water resource assessment. Present methods for obtaining this data are hazardous, difficult and time consuming. Additionally, some of these current methods can provide early warning to potentially flood prone communities down river due to resulting flooding caused by river/icing conditions during a spring thaw. Having such an early warning system minimizes loss of life and property damage by giving affected communities enough time to take appropriate measures.

There are two known methods for detection of ice sheet movement. The first method entails full time observation by a person which has an obvious limitation of not being reliable due to darkness and/or low-visibility weather conditions. The second method entails instrumentation specifically designed to detect river ice motion without the need of human intervention. This instrumentation comprises a wire embedded in a river ice sheet which provides a one-time indication of ice movement. When the ice moves, the wire breaks, opening a circuit which trips an alarm. Limitations of this method includes: i) an initial potentially hazardous wire deployment across an ice sheet or rubble field, and ii ) physically positioning such a system along a river bank where ice scour of the river bed and banks often can occur thus preventing use of this method. Such instrumentation is disclosed in U.S. Pat. No. 4,680,961 entitled "System and Method For Ice Movement Detection In Determination of Ice Breakup."

Moreover, both of these methods above are not adequate for determining kinematic data of the ice, i.e. velocity or acceleration thereof. Such data is important for: i) analyzing river/ice dynamics and ii) determining the magnitude of potential flooding of towns down river of the ice cover. Current kinematic data methods for determining ice sheet and rubble ice conditions during ice breakup use video data recording techniques which require tedious, frame-by-frame motion analysis of the video data of such an event. Limitations of such a method include: i) equipment and operator must be present at the event; ii) this technique is ineffective during night or poor visibility conditions; and iii) requires the inclusion of known reference landmarks in a video frame for accurate kinematic measurements of the ice which may not be practical under certain viewing conditions.

Since no methods or hardware exist for either detecting river ice motions or determining river ice kinematic measurements that: i) requires no observer intervention, ii) is unaffected by darkness and/or low visibility conditions, or iii) is resetable for multiple events; the microwave Doppler radar system of the instant invention herein solves these problems.

SUMMARY OF THE INVENTION

The present invention pertains to a microwave continuous wave (CW) Doppler radar system for river ice motion detection and real-time kinematic data acquisition using digital signal processing equipment for processing, storing and displaying such data. With less complex electronic signal processing hardware, a Doppler radar ice motion detection and alarming system can be used in conjunction with the system. River ice kinematic measurements are fundamental to analyses of river/ice dynamics. The system herein can be rapidly deployed, requires minimal operator interaction, and can continuously acquire, process, store and display ice kinematic data regardless of visibility conditions. Use of the Doppler radar system is an effective, efficient and precise method and apparatus for obtaining river ice kinematic data.

OBJECTS OF THE INVENTION

Accordingly, several objects and advantages of the invention herein are:

(a) To provide a Doppler radar based system that is unaffected by daytime/weather Conditions and still provide reliable kinematic data.

(b) To provide a Doppler radar based system that can be rapidly deployed and can acquire kinematic ice river motion data, around-the-clock, without operator intervention. Results from the system can be viewed and/or stored for later analysis.

(c) To provide a Doppler radar based system that provides kinematic data of comparable accuracy to that derived from video recordings of the event. Still further advantages will become apparent from consideration of the ensuing detailed description.

DETAILED DESCRIPTION

Figure 1A:
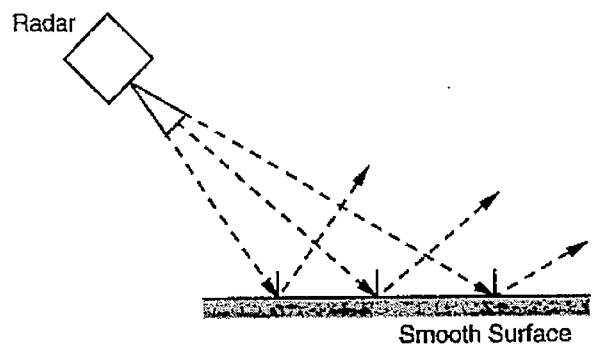
FIG. 1a, FIG. 1b and FIG. 1c show radar scatter from a smooth ice surface, a rough ice surface and the relative positioning of the radar system with respect to the river under observation.
Figure 1B:
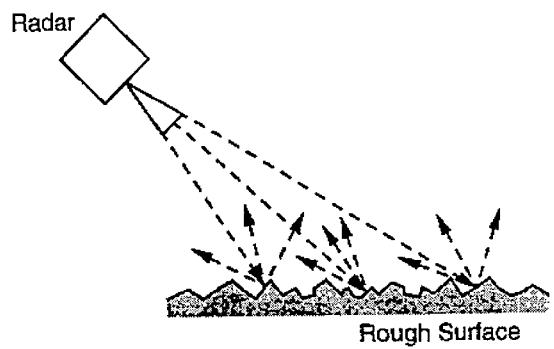

In a continuous wave (CW) Doppler radar system, a single frequency radio frequency (RF) carrier is transmitted towards the target at an oblique look-angle. If the radar-illuminated area were perfectly smooth, transmitted energy incident to the surface would be reflected away from the radar as shown in FIG. 1a, but because of the inherent roughness of sheet ice and rubble fields there is sufficient backscatter towards the radar antenna to facilitate Doppler kinematic measurements as shown in FIG. 1b. If the target is moving, the backscattered radar signal exhibits an apparent shift from the transmitted carrier frequency; higher if moving toward, and lower if moving away from the radar. The difference between the transmitted frequency and the apparent frequency of the backscattered signal is the Doppler frequency and is proportional to the velocity of the target. Lewis et al. in *Detection and Classification of Ice*, Wily & Sons, (1987) The backscattered power received $P_r$ is related to system and target parameters by:

$$P_r=\{P_tG^2\lambda As\}/\{(4\pi)^3R^4L\} \quad (1)$$

where $P_t$ is power transmitted, G is antenna gain, $\pi$ is radar wavelength used, R is range to the target, A is area illuminated by the radar, L represents system losses, and s is normalized cross section of the target. An ideal reflector returns all incident energy back to the source, corresponding to s. The radar cross section of a target is defined as the normalized area of an ideal reflector which would return the same signal strength as the target. Several factors affect the radar cross section of a given target including transmitted wavelength, target geometry, aspect and reflectivity. A calibrated radar system is required in order to measure s for various target conditions. Moving river ice presents an non-homogeneous target with complex and variable geometry, and radar cross section can vary widely. All additional requirement for Doppler velocity measurement is that the frequency shift obtained must be resolvable by the radar system.

Figure 1C:
Figure 1C:
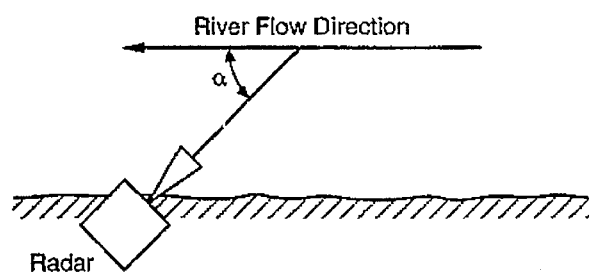
Figure 2:
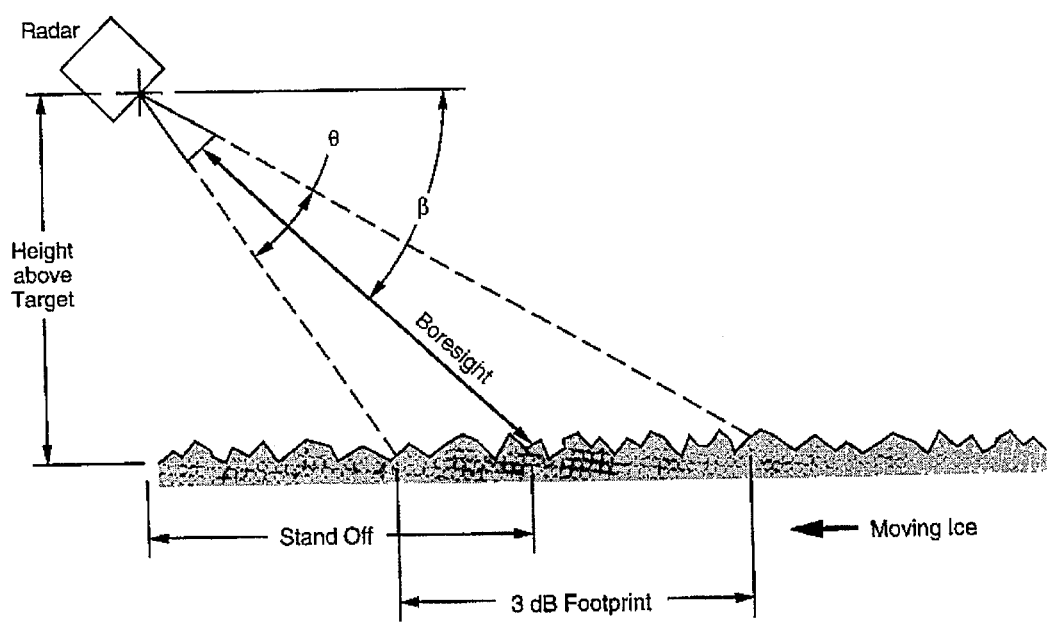
FIG. 2 shows the physical relationship of Doppler radar system with respect to an ice surface and defines the terms & parameters used.

The magnitude of the Doppler frequency shift, $f_{dop}$, for a target moving at a given velocity, v (m/s) is:

$$f_{dop}=|2v \cos(\beta) \cos(\alpha)|/\pi \quad (2)$$

where $\beta$ is the vertical depression look-angle, $\alpha$ is the horizontal off-stream look-angle, $\pi$ is the wavelength of RF source which is $c/f_{source}$ where c=velocity of light in a vacuum and $f_{source}$ is the carrier frequency of RF source (Hz). FIG. 1c & FIG. 2 illustrate the physical relationship of the angles $\alpha$,q, and $\beta$ for the ice velocity measurement.

In a CW Doppler radar, a low-level sample of the transmitted carrier frequency ($f_{source}$) is used as a reference and is mixed with the received backscatter signal. The mixing process results in four frequency products: the reference signal, the backscattered signal, the sum and difference of reference and backscattered frequencies. The difference frequency resulting from the mixing process is $f_{dop}$. If there is no motion of the target surface then $f_{dop}=0$. Therefore, the presence or absence of a Doppler frequency target surface then $f_{dop}=0$. Therefore, the presence or absence of a Doppler frequency signal indicates the presence or absence of ice motion and thus providing a correlating means for kinematic determinations and motion detections to effect a warning signal.

Figure 4:
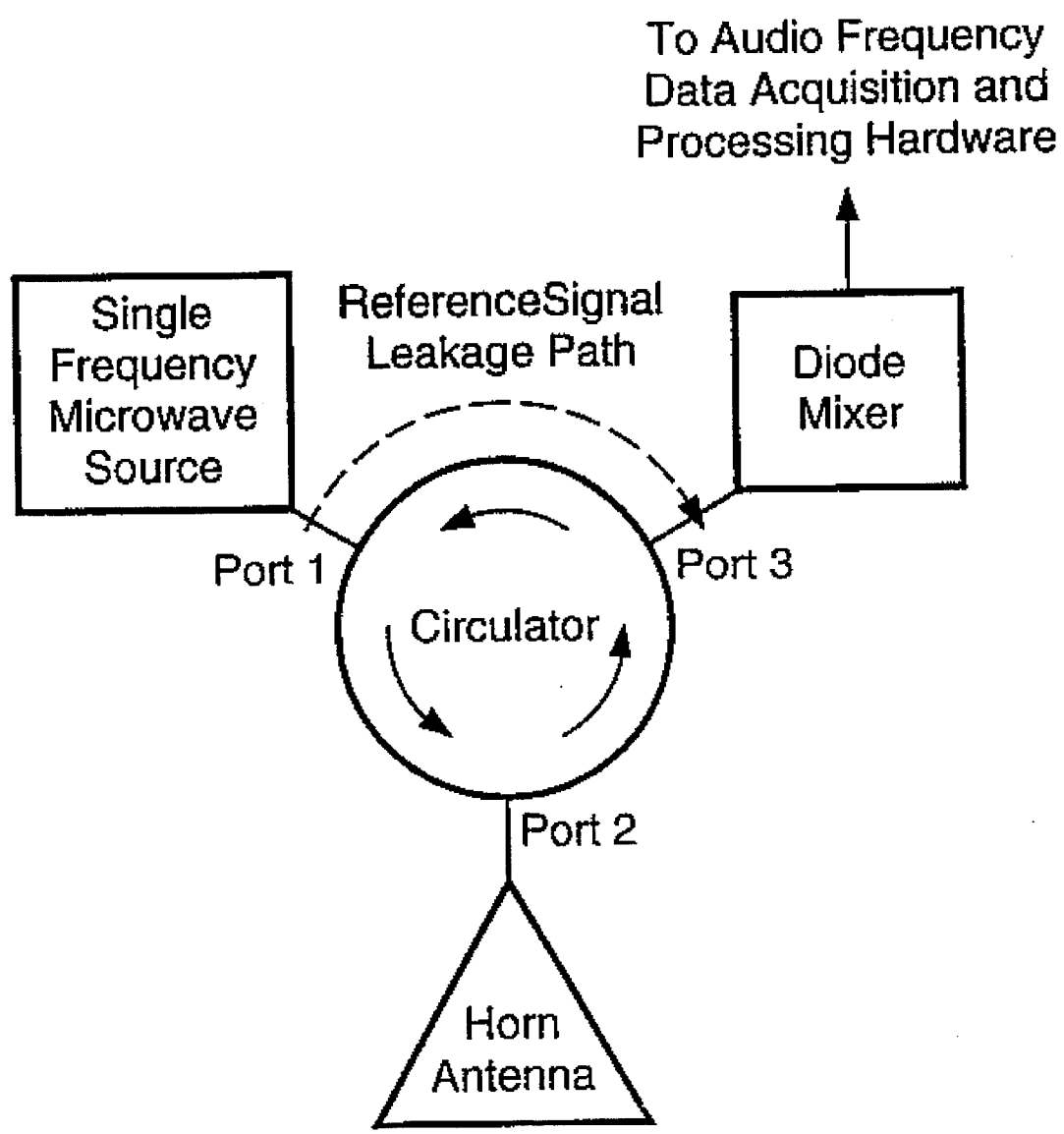
FIG. 4 shows the components of a Doppler radar system used for detection and kinematic measurements of river ice flow.
Figure 5:
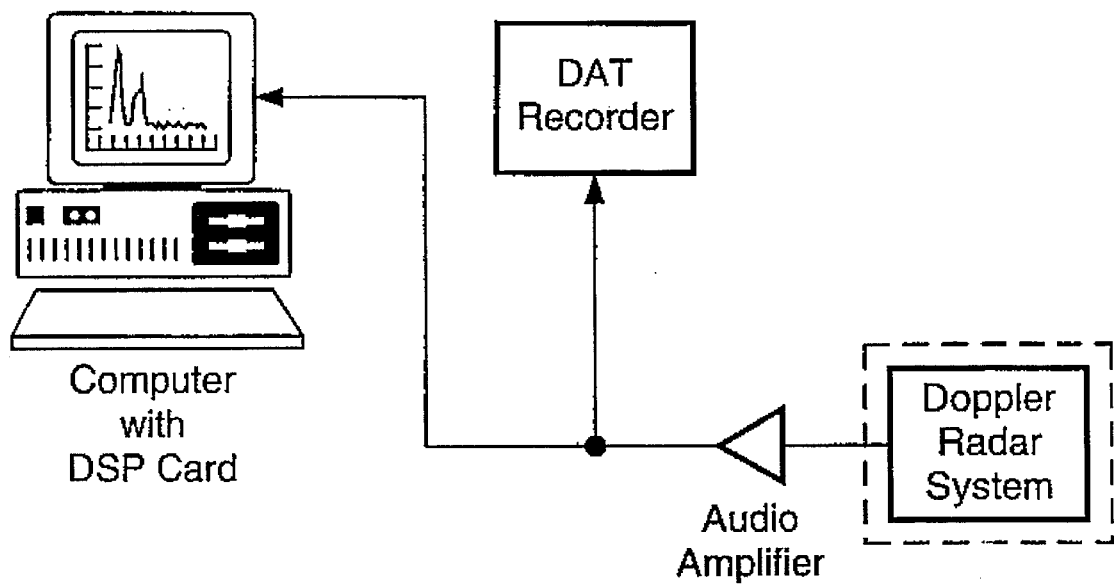
FIG. 5 shows the Doppler Radar System as shown in FIG. 4 in combination with a computer based digital signal processing (DSP) card and data (DAT) Recording Unit.

The Doppler radar system of the instant invention as shown in FIG. 5 comprises a radar front end system in combination with a data acquisition and signal processing computer. In certain applications, the computer and data acquisition hardware can be replaced by simpler logic based electronics with appropriate alarm hardware if kinematic measurements are not required. This is represented as the Processing Hardware in FIG. 4. An example of such a radar based warning system for warning of an impending natural disaster includes U.S. Pat. No. 4,300,121 by Fritzche entitled "Warning System For Traffic Routes At An Avalanche Danger Hillside." This teaching uses Doppler radar hardware and associated electronic alarm equipment for an early warning avalanche detection system. Although this teaching is another example of an Doppler radar based warning system, it does not teach or suggest the instant invention's: i) methodology for detection of ice motion or ii) the hardware combination required for determining river ice kinematic measurements.

Figure 3:
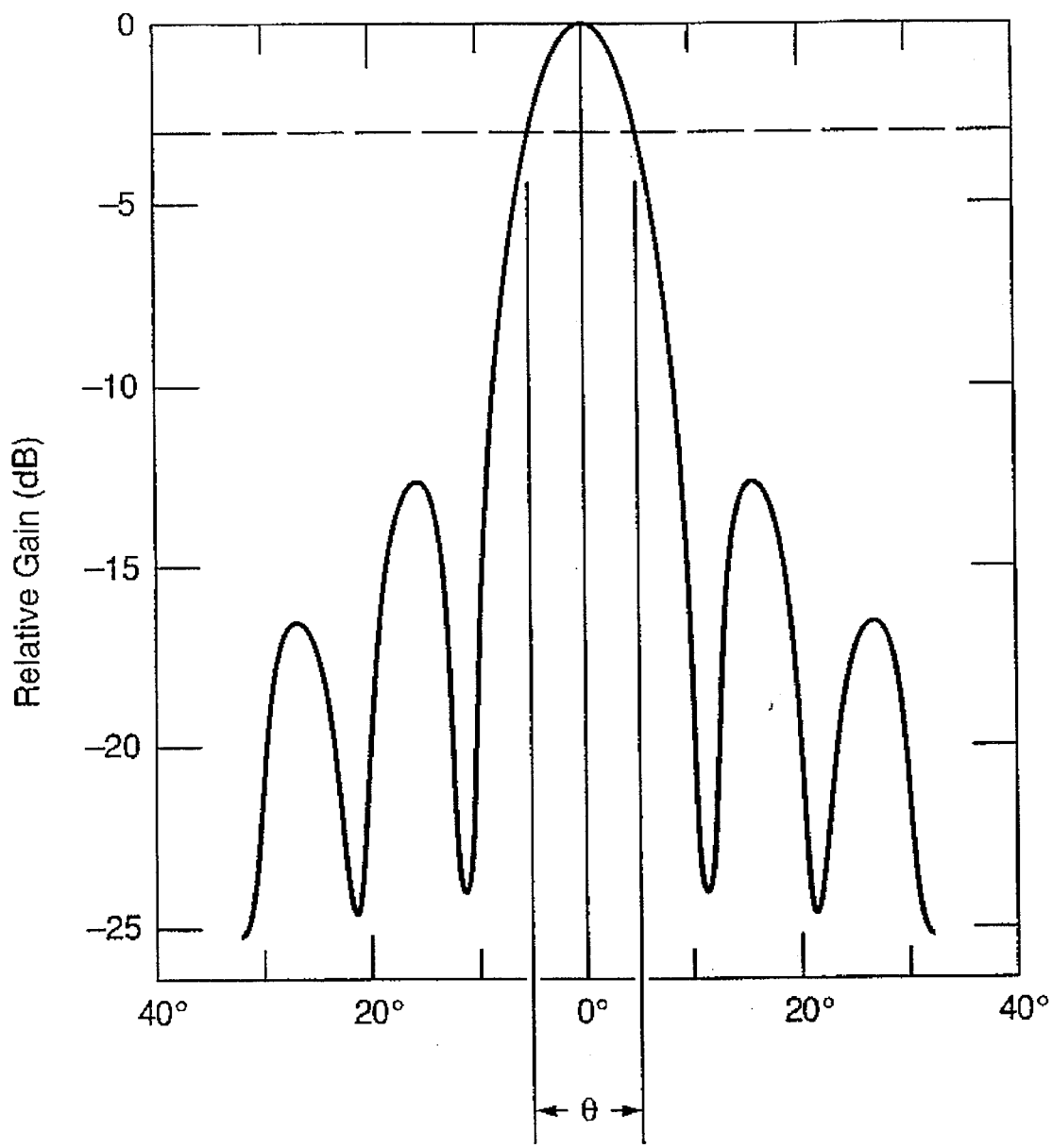
FIG. 3 shows 3-dB radar bee-width θ of a radar antenna.

The front-end of the Doppler system consists of a single standard gain horn antenna connected via a circulator to a single-frequency microwave source, e.g. a Gunn oscillator, and a single-ended diode mixer. The circulator, is a ferromagnetic device that commutates power entering on a sequential port to port basis as shown in FIG. 4. Ideally, all power entering Port 1 is transmitted to Port 2, all power entering Port 2 is transmitted to Port 3, and all power entering Port 3 is transmitted to Port 1. Port-to-port isolation in the reverse direction is not complete, with a typical power "leakage" of about −20 dB. The leakage between ports 1 and 3 is used as the reference signal for the mixer. Such radar systems are well known in the art as shown in U.S. Pat. No. 4,195,296 by Williams entitled "Microwave Circulator" or U.S. Pat. No. 4,495,499 by Richardson entitled "Integrated Oscillator-Duplexer-Mixer" which are incorporated by reference. The radar system of the current invention is mounted on a tripod or similar rigid mounting device. The radar system must be accurately positioned with an inclinometer to within ±1° in the vertical plane and mounted from a fixed point overlooking the river as shown in FIG. 1c with a predetermined angle $\alpha$. Horizontally, the radar is visually aimed upstream at a known calibrated angle $\alpha$ relative to the direction of river flow. The power transmitted by the radar does not impact a single point on the ice target surface which is aligned with the antenna boresight center, but is distributed over an area on the surface with the incident power diminishing with distance from the boresight. This is shown as a 3-dB footprint width in FIG. 2. This foot print defines as the angular radar beam-width q at the half-power points as shown in FIG. 3.

Figure 6:
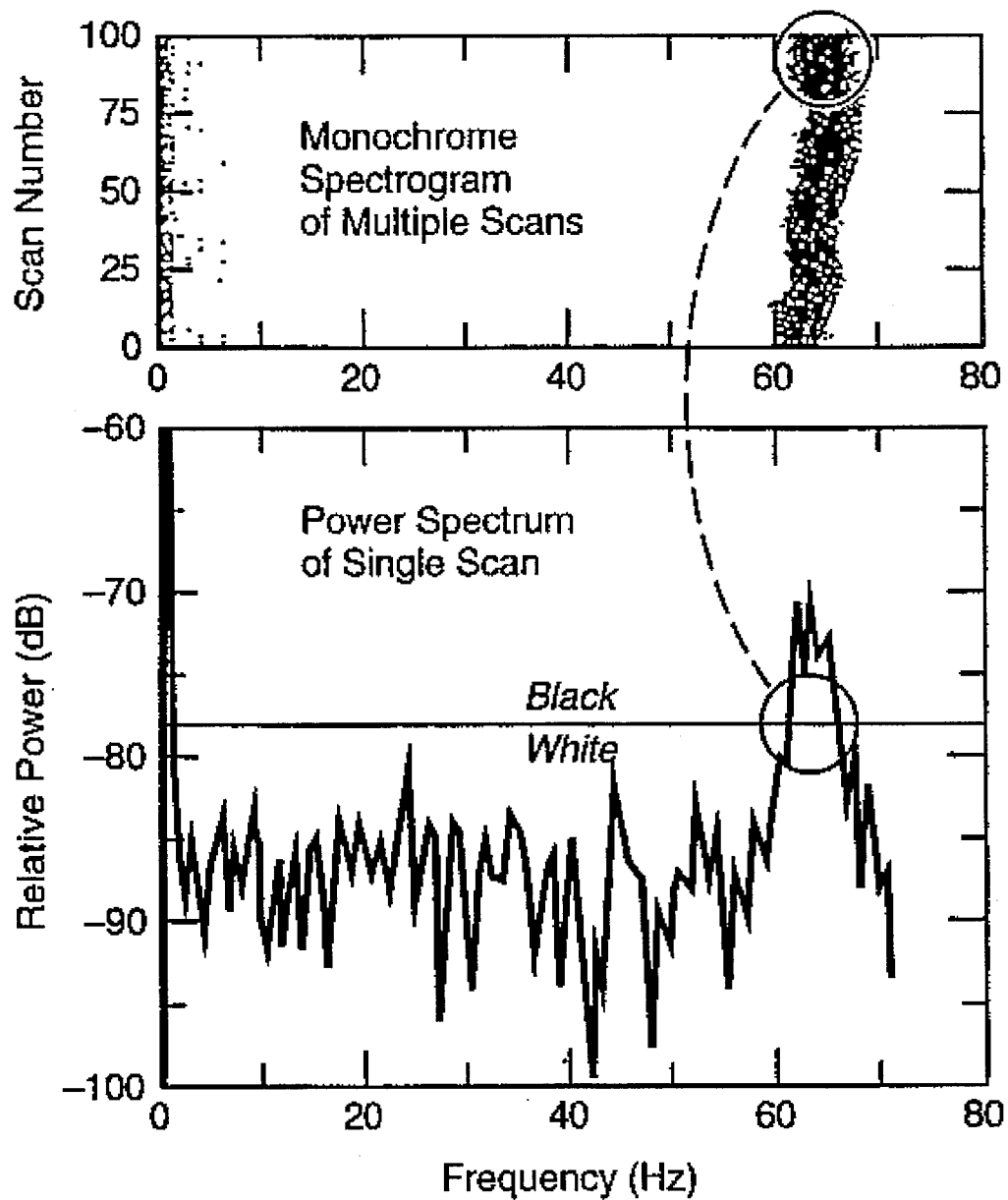
FIG. 6 shows a single-scan and multiple scans that indicate the relationship between the amplitude threshold setting and the Doppler frequencies bandwidth.

Data acquisition and display functions are performed by a computer, e.g. a personal computer as shown in FIG. 5. A Digital Signal Processing (DSP) card is incorporated into the computer that acquires radar signal data through an audio amplifier. The DSP card processes processes frequency data of a digitized signal using a Fourier transform means. Continuous real-time Doppler data may be stored on a digital audio tape (DAT) data recorder for later playback, processing and analysis. The resulting power spectrum can be displayed in either a single-scan format or as a continuous series of scans in spectrographic form as shown in FIG. 6. In a spectrogram, discrete signal magnitude quanta can be represented by a range of color or gray scale. With 16-shade gray scale graphics, this results in maximum signal magnitudes appearing as black and intermediate levels appearing as lighter shades of gray. Below a preset magnitude threshold, all signal magnitudes are shown as white. A multicolor spectrographic display provides a 256-shade color gradient that can significantly improve graphical resolution.

Systems with large beam width antennas require additional data analysis to obtain an accurate kinematic data from the Doppler frequency band at each selected time throughout the record. If the actual vertical angle $\beta$ representing any point in the frequency band is known, the velocity at the corresponding tune can be obtained from equation (2) above. However, these angles are not generally known. The apparent far and near edge returns are the most readily identifiable locations on the frequency band. The apparent width of this band depends on the antenna beam width and the threshold setting on the power spectrum of the backscattered signal. An initial step in data reduction is to replace the frequency scale of the data band by a velocity scale using equation (2) with the boresight angle as $\beta$. The center of this band is the approximate ice velocity, and it can be obtained immediately. For more precise work during post processing, the apparent far and near edge velocities $v_+$ and $v_-$ corresponding to the upper and lower edges of the band are related to each other and the desired velocity v as follows:

$$v=(\cos \beta/(\cos \beta-\Omega))v_+=(\cos \beta/(\cos \beta-\Omega))v_- \quad (3)$$

where $\Omega$ is an apparent beam width angle ($q_a/2$). The velocity v corresponding to the antenna boresight is bounded above by $v_+$ and $v_-$. The difference between the edge velocities as a percentage of the velocity v from (3) as:

$$(v_+-v_-)/v=(\cos (\beta-\Omega) -\cos (\beta+\Omega))/ \cos \beta \quad (4)$$

Figure 7:
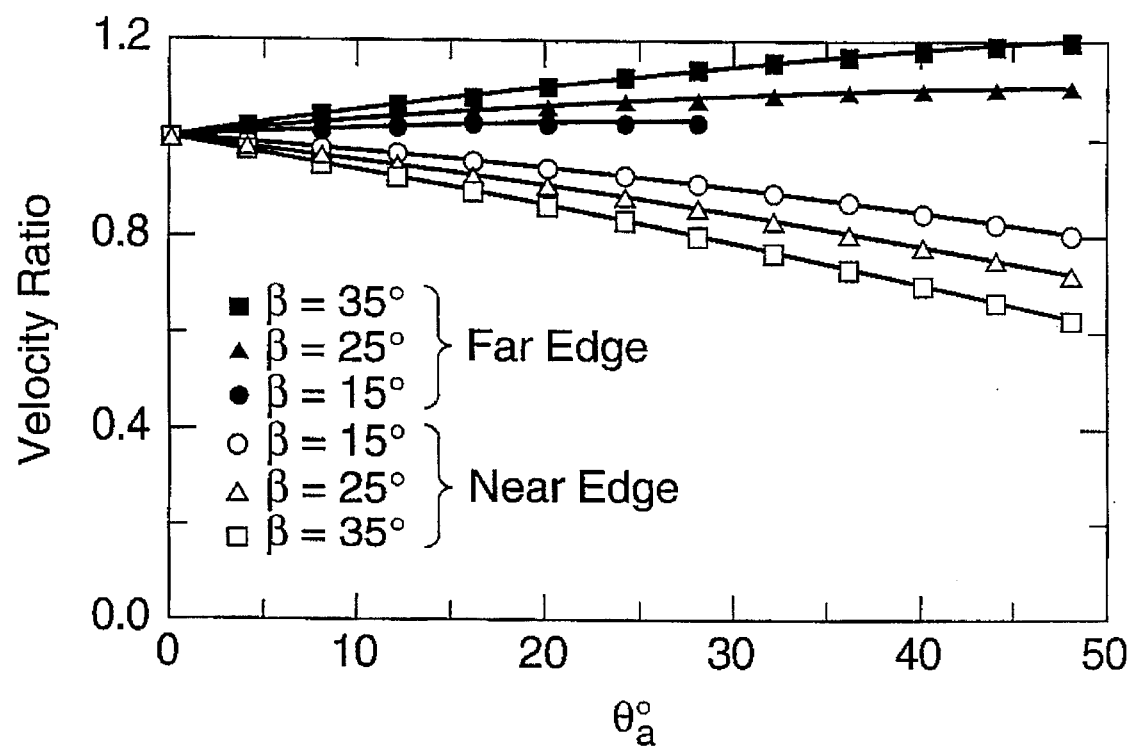
FIG. 7 shows a relationship between the velocity ratio and $\theta_a$, the apparent beam-width angle, for both the near and far edges of the beam width and a range $\beta$ values where $\beta$ is the radar boresight angle.
Figure 8:
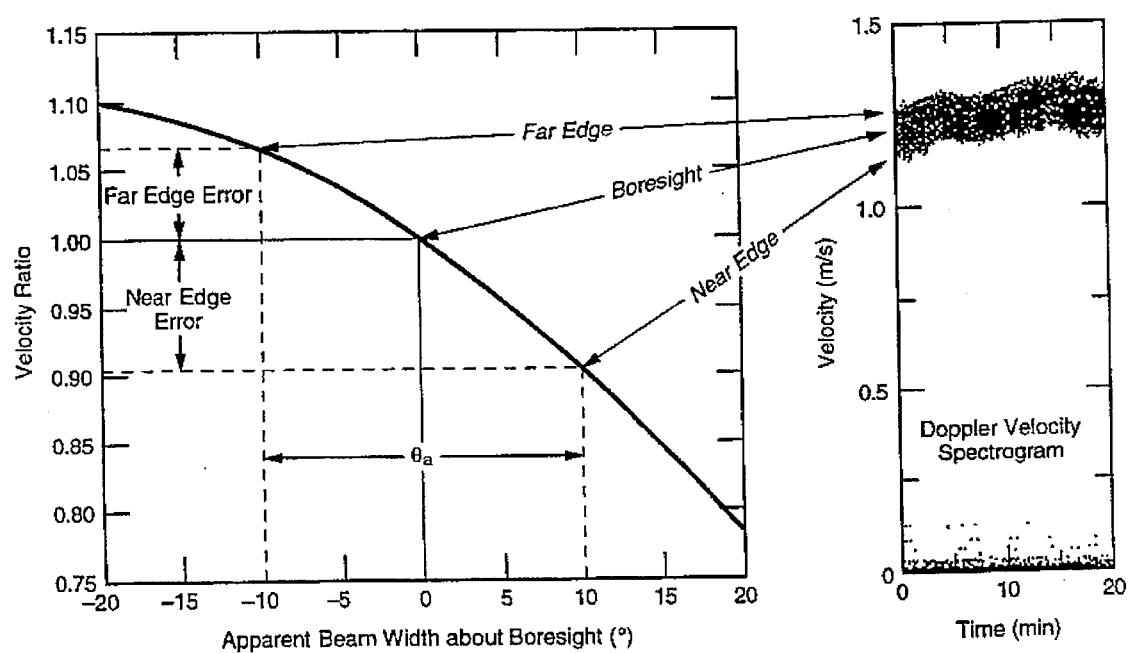
FIG. 8 shows an example that quantifies the near and far edge velocity ratio with the boresight Velocity for a specific case, $\beta=25°$ and $\theta_a=20°$, and relates them to specific locations on the spectrogram.

The near and far edge velocity ratios $v_-/v$ and $v_+/v$ are plotted in FIG. 7 as a function of $q_a$ for a range of boresight angles $\beta$. The potential beam width errors increase significantly with $q_a$ for all boresight angles, and increase with $q_a$ for all beam widths. A sample Doppler velocity spectrogram is related to the velocity ratio relationship for $\theta=25°$ and $q_a=20°$ in FIG. 8.

Manipulating the relationship between the edge velocities in equation (4), $q_a$ is represented as where $(v_+/v_-)=\mu$ as follows:

$$q_a=2 \tan^{-1}\{(\mu-1)/[(\mu+1)\tan\beta]\} \quad (5)$$

If both upper and lower bounding traces are drawn consistently, $q_a$ should vary randomly within a narrow range. Velocity estimates $v_1$ and $v_2$ are obtained with the mean $q_a/2$ which is defined as $\Delta$ is:

$$v_1=[\cos \beta/(\cos \beta-\Delta)]v_+ \text{ and } v_2=[\cos \beta/(\cos \beta+\Delta)]v_-+\text{tm} \quad (6)$$

Finally, the measured Doppler velocity v, representing the bulk ice velocity within the radar footprint, is taken as the average of $v_1$ and $v_2$. Additionally, the derivative of the velocity with respect to time of this data provides acceleration data.

Figure 9A:
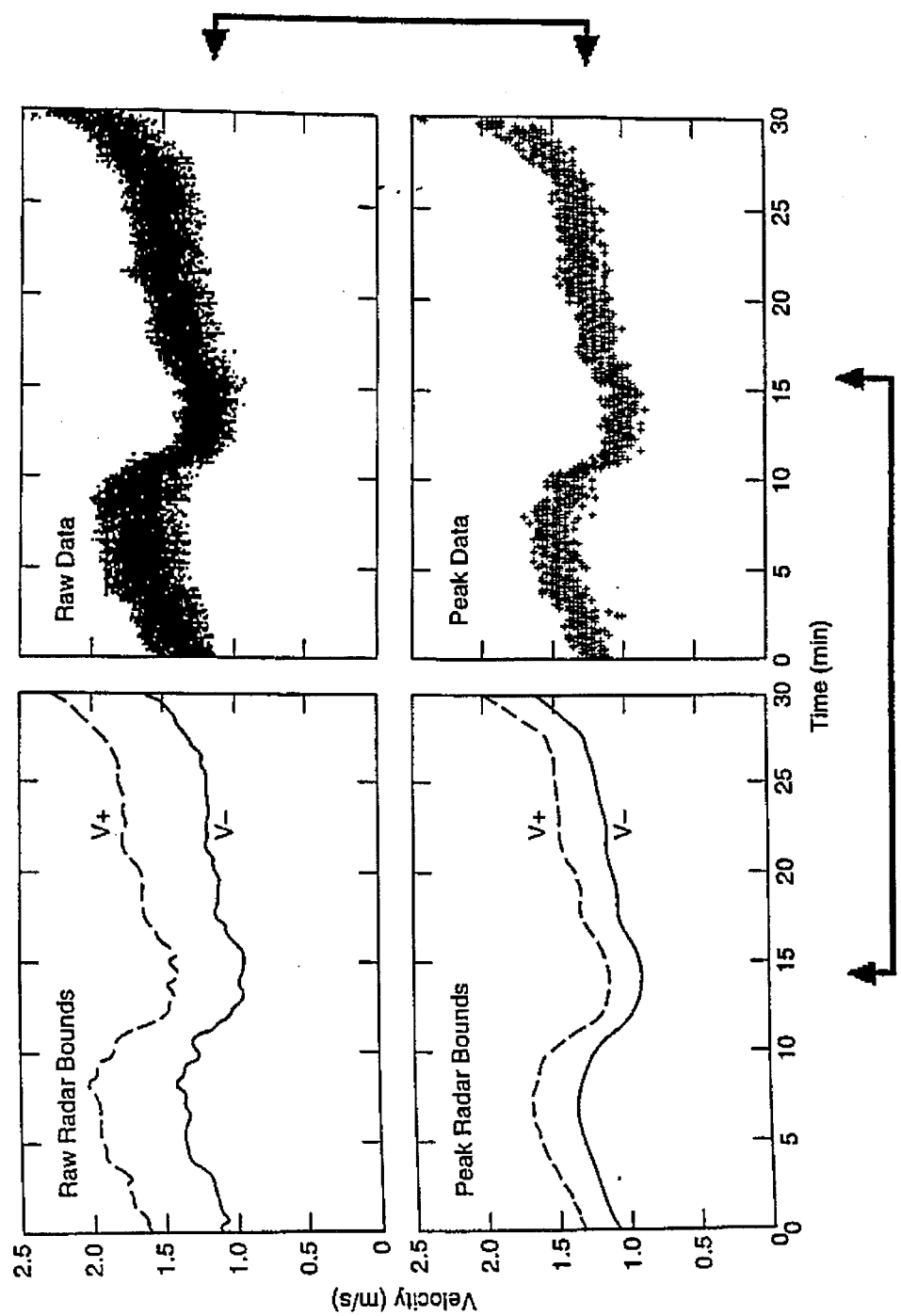
FIG. 9a shows a data band of raw Doppler velocities and peak returns for the ice breakup event, and boundaries that are drawn for each of these data sets.
Figure 9:
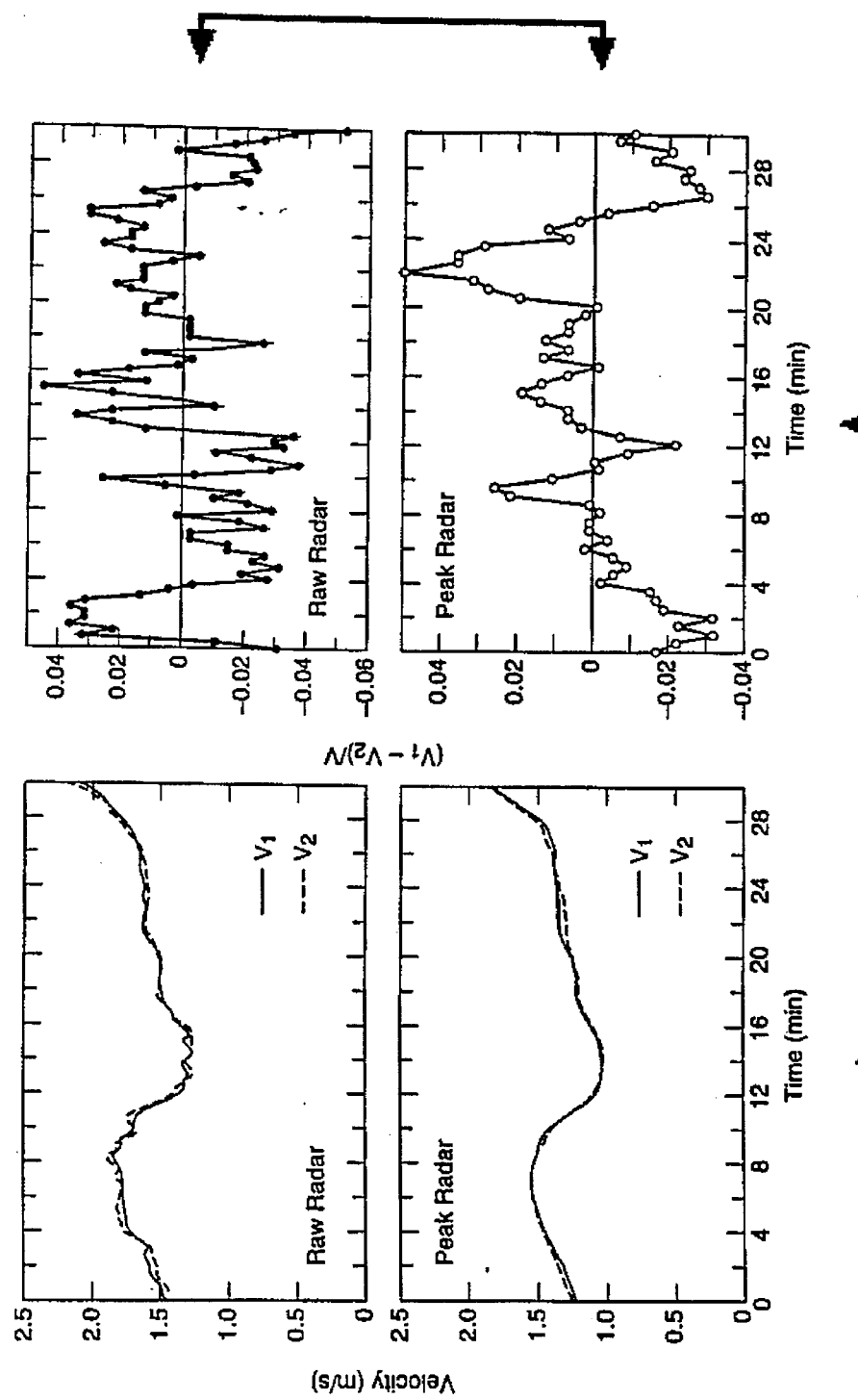
FIG. 9b shows a calculated $\theta_a$ as a function of time for raw and peak radar records for an ice breakup event. These values result from an equal boresight velocity requirement for the near and far edge traces.
FIG. 9c shows the ice breakup boresight velocities and their normalized difference obtained from the edge traces with the corresponding mean $\theta_a$ of both the raw and peak radar data records.
Figure 9B:
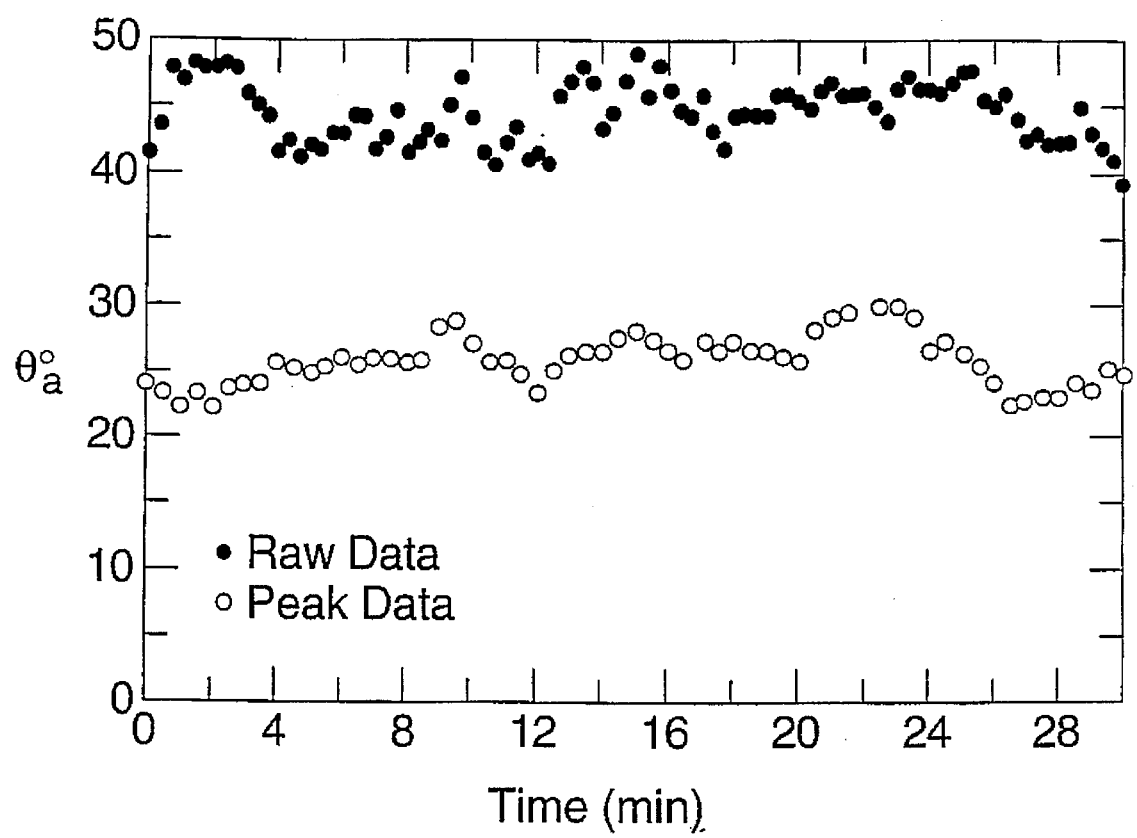

FIGS. 9a, 9b and 9c show actual kinematic data of ice movement in real-time. A CW Doppler radar with associated real-time data acquisition and digital signal processing equipment was mounted on a bridge over the Connecticut River during an ice breakup, and again during a frazil ice run prior to ice cover formation. Ice velocity data were continuously acquired, processed, displayed and stored during these two events. Specifications that characterize the radar system used during these test are as follows:

|  | Break-up | Frazil Run |
| --- | --- | --- |
| Microwave Band | C | k |
| Frequency | 5 GH | 30 GH |
| Antenna Gain | 15 dB | 27 dB |
| 3 dB Antenna Beamwidth | 20° | 9° |
| Microwave Power | 20 dBm | 20 dBm |

ICE BREAKUP EVENT

The radar antenna was mounted about 6 m above the ice and aimed directly upstream with an angle 0° of 25° below horizontal. The streamline where video data were obtained passed through the footprint of the radar. Ice breakup was underway at a river flow of approximately 850 m³/s when measurements began. For most of this record the ice was densely packed rubble that provided strong radar reflections. Toward the sampling period end, the surface ice concentration diminished and the ice velocity increased.

The ice velocity-time trace obtained from the Doppler frequency band is presented in FIG. 9a. Digital signal processing software identified the peak return from each radar scan in this record, with about one scan per second. These peak detector data, representing the highest magnitude power reflections from within the footprint illuminated by the radar, are also plotted in FIG. 9a. Both of these data sets were processed by first identifying the upper $v_+$ and lower $v_-$ edges of the trace at 20- or 30- second intervals throughout the record, and the results are shown in FIG. 9a. The peak returns generally originated close to the near edge of the footprint, consistent with the inverse relationship between backscattered power and range to the fourth power given in equation (1) above. Using the equation (5) above, $q_a$ for both the raw and peak detector data records are represented in FIG. 9b as a function of time. For the raw data record the mean, median and mode of $q_a$ are approximately equal, with a mean of 44.6°, a standard deviation of 2.2°, and a range of 10.0°. The mean, median and mode of $q_a$ for the peak data record are also approximately equal, with a mean of 26.0°, a standard deviation of 2.1 and a range of 9.4°. The peak finding algorithm significantly reduced the apparent beam width of the radar, without altering the $q_a$ distribution. The $v_1$ and $v_2$ results and the difference between these values non-dimensionalized by the corresponding mean velocity are given in FIG. 9c. Except for a few points, the absolute value of this dimensionless difference was less thin 0.04, corresponding to an absolute value of the difference between v and either $v_1$ or $v_2$ of less than 0.02 v. The delineation of the limits of each radar trace and calculation of a mean q has reduced the large potential beam width error to the same order as the other minor errors inherent in Doppler velocity measurement. The peak data are smooth relative to the raw data, but are shifted systematically to lower velocities, following the downward shift of the far edge of the trace. The resulting mean velocity of the peak radar record was 1.35 m/s, while that of the raw radar record was 1.61 m/s.

Frazil Ice Run

Doppler radar ice kinematic records were obtained for the Connecticut River similar to those of the ice breakup. Frazil pans and floes were moving downstream during the measurement period at a river flow of about 170 m$^3$/s, just prior to ice cover formation. Over several hours of data collection the river flow and ice velocity conditions were relatively steady, and selected a typical 1000-s record for analysis. The radar antenna was mounted at the same height and location as in the breakup, about 1.1 m above the lower water surface. In order to reduce the data processing requirements of the method, an antenna with a much narrower beam the frazil floes and the greater target range relative to the ice breakup conditions. With slower ice motion expected, the wavelength of the radar was decreased in order to improve the velocity resolution. Using equation (2) above, the Doppler frequency shift needed to resolve velocity differences of 0.05 m/s is only 1.5 Hz for a 5-GHz source. The corresponding frequency shift increases to 9 Hz with a 30-GHz source. The modified radar system specifications are given in the above table of the event.

The CW Doppler radar system for kinematic measurements & motion detection can be realized using a variety of hardware-only or hardware and/or software hybrid implementations for performing the signal generation, data acquisition, processing, display, and alarming functions. However, in all configurations, the basic principles described herein maintain. Variations can include a high gain, narrow beam antenna to improve signal-to-noise performance of a Doppler radar system and minimize data processing requirements. An increase in the source frequency of the system provides a proportional increase in the velocity resolution. Significant cost reduction and miniaturization can now be realized through application of off-the shelf 10-GHz and 24-GHz microwave transceiver modules consisting of a horn antenna, circulator, diode mixer and Gunn oscillator. These modules only require connections to dc power source and to a data acquisition computer via adequate communication links, e.g. satellite transmissions, to realize the Doppler radar system provided herein. Moreover, long term or permanent mounting of a radar front end system equipment at strategic points on a river can provide an early warning and continuous monitoring system of a river's ice freeze-up or breakup. A laptop computer equipped with a appropriate data acquisition cards enhance system portability and reduce power requirements.

Although the description above contains many specificities, these should not be construed as limiting the scope of this invention as set forth in the appended claims, but as merely providing illustration of the presently preferred embodiment of this invention.

We claim:

1. A method of detecting and outputting information of ice motion automatically in a frozen river, comprising the steps of:

(a) mounting a continuous wave microwave Doppler radar unit with horn antenna on a shore overlooking the frozen river such that the antenna is within a ±10° in a vertical plane to the shoreline and horizontally aimed at a point upstream in the river at a known angle relative to the river flow;

(b) connecting the radar unit to a power/control unit that provides power to the radar unit and outputting an electrical signal from the radar unit that correlates to information of the ice motion;

(c) detecting the electrical signal from the radar unit; and (d) applying appropriate signal processing to render motion, velocity and acceleration indication.

(e) outputting information of the ice motion.

2. The method of claim 1 wherein the step of outputting information of ice motion is an activation signal for an alarm device so that an early warning river flooding system is enabled.

3. The method of claim 1 wherein the step of detecting the electrical signal includes wireless means for transmitting the signal for detection at a remote location.

4. The method of claim 1 wherein an additional step of computing is performed before the step of outputting information of the ice motion by; i) transducing the electrical signal and ii) then using a computer means to perform computations on the transduced electrical signal whereby the information outputted provides kinematic data of the river ice.

5. The method of claim 4 wherein the computation step performed by the computer means determines ice velocity data calcualated by:

$f_{dop} = [2 \, v \cos(\beta) \cos(\alpha)]/\lambda$ where v=the velocity of the ice, α=horizontal off-river look-angle, β=vertical depression angle from the radar, λ=wavelength of the radar source, and $f_{dop}$=the Doppler frequency shift, with $f_{dop}$ being a center of a 3-dB bandwidth in the radar's frequency output spectrum which correlates to ice velocity.

6. The method of claim 5 wherein the computation step further includes further refinement of the ice movement velocity v by:

calculating in the following substeps beginning with an apparent far and near edge velocities $v_+$ and $v_-$ respectively corresponding to an upper and lower edges of the frequency output spectrum band of the radar at the angle β that are related to each other and the ice velocity v as follows:

(a) $v=[\cos \beta/(\cos \beta-\Omega)]v_+ = [\cos \beta/(\cos \beta-\Omega)]v_-$ where Ω=an apparent beam width angle ($\theta_a/2$), and v=a velocity corresponding to the radar antenna boresight angle β which is bounded by $v_+$ and $v_-$;

(b) $\theta_a = 2 \tan^{-1}\{(\mu-1)/[(\mu+1)\tan \beta]\}$ where $\theta_a$=apparent boresight angle, and μ=($v_+/v_-$);

(c) $v_1=[\cos \beta/(\cos \beta-\Delta)]v_+$ and $v_2=[\cos \beta/(\cos \beta+\Delta)]v_-$ where $v_1$ and $v_2$=velocity estimates, and Δ=a mean value of $\theta_a/2$; and finally (d) $\underline{v}=(v_1+v_2)/2$ where $\underline{v}$ represents bulk ice velocity movement within the radar's footprint.

7. An automatic system for detecting and making kinematic ice motion determinations of a frozen river, comprising:

(a) a means for stable mounting and positioning of a continuous wave Doppler radar unit with an associated directional horn antenna at a frozen river shoreline location so that accurate raw kinematic data of the river ice flow conditions can be determined;

(b) the continuous wave Doppler radar unit includes a single frequency microwave source, a diode mixer, a circulator, and the horn antenna;

(c) an electrical power, control and output electrical signal output transmission means for the radar unit;

(d) a computer with a data recording means with digital signal processing capability that receives and processes an electrical signal correlating to river ice motion; and (e) an output device from the computer for providing information of the river ice motion.

8. The system of claim 7 wherein the computer with digital signal processing capability provides information at the output device of ice velocity data information is determined by the computer for determining:

$$f_{dop} = [2 \, v \cos(\beta) \cos(\alpha)]/\lambda$$

where $v$ = the velocity of the ice, $\alpha$ = horizontal off-river look-angle, $\beta$ = vertical depression angle from the radar, $\lambda$ = wavelength of the radar source, and $f_{dop}$ = the Doppler frequency shift, with $f_{dop}$ being a center of a 3-dB bandwidth of the radar's frequency output spectrum which correlates to ice velocity.

9. The system of claim 8 wherein the computer means for further refinement of the ice movement velocity $\underline{v}$ by calculating in the following substeps beginning with an apparent far and near edge velocities $v_+$ and $v_-$ respectively corresponding to an upper and lower edges of the frequency output spectrum band of the radar at the angle $\beta$ that are related to each other and the ice velocity $v$ as follows:

(a) $v = [\cos \beta/(\cos \beta - \Omega)]v_+ = [\cos \beta/(\cos \beta - \Omega)]v_-$ where $\Omega$ = an apparent beam width angle $(\theta_a/2)$, and $v$ = a velocity corresponding to the radar antenna boresight angle $\beta$ which is bounded by $v_+$ and $v_-$;

(b) $\theta^a = 2 \tan^{-1}\{(\mu-1)/[(\mu+1)\tan\beta]\}$ where $\theta_a$ = apparent boresight angle, and $\mu = (v_+/v_-)$;

(c) $v_1 = [\cos \beta/(\cos \beta-\Omega)]v_+$ and $v_2 = [\cos \beta/(\cos \beta+\Delta)]v_-$ where $v_1$ and $v_2$ = velocity estimates, and $\Delta$ = a mean value of $\theta_a/2$; and finally (d) $\underline{v} = (v_1+v_2)/2$ where $\underline{v}$ represents bulk ice velocity movement within the radar's footprint, and the output device outputs the refined velocity measurement.

10. The system of claim 7 further comprising a means for activating an electronic alarm by the electronic hardware, so that an early warning flooding system is provided.

* * * * *